United States Patent
Shimizu et al.

(10) Patent No.: US 10,282,770 B2
(45) Date of Patent: May 7, 2019

(54) CALCULATING A DEGREE OF FIT OF A GOLF PRODUCT BASED ON CAPTURED SWING DATA

(71) Applicant: Bridgestone Sports Co., Ltd., Tokyo (JP)

(72) Inventors: Takuichi Shimizu, Chichibu (JP); Shunsuke Tayama, Tokyo (JP); Yosuke Nakayama, Tokyo (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 264 days.

(21) Appl. No.: 15/183,996

(22) Filed: Jun. 16, 2016

(65) Prior Publication Data
US 2016/0379294 A1    Dec. 29, 2016

(30) Foreign Application Priority Data

Jun. 23, 2015  (JP) ................................ 2015-125924

(51) Int. Cl.
*G06Q 30/00* (2012.01)
*A63B 24/00* (2006.01)
(Continued)

(52) U.S. Cl.
CPC ..... *G06Q 30/0631* (2013.01); *A63B 24/0006* (2013.01); *A63B 53/00* (2013.01); *G06Q 30/0281* (2013.01); *G06Q 30/0627* (2013.01)

(58) Field of Classification Search
CPC . A63B 24/00; A63B 24/0003; A63B 24/0006; A63B 24/0009; A63B 24/0012;
(Continued)

(56) References Cited

U.S. PATENT DOCUMENTS 8,758,171 B2    6/2014   Hasegawa et al.
8,801,547 B2    8/2014   Kamino et al.
(Continued)

FOREIGN PATENT DOCUMENTS

JP         4224778 A    8/1992
JP      2002133202 A    5/2002
(Continued)

OTHER PUBLICATIONS

GA TOUR Superstore Announces Opening of 17th Location. PRWeb. Nov. 6, 2013. (Year: 2013).*

*Primary Examiner* — William J Allen
(74) *Attorney, Agent, or Firm* — Sughrue Mion, PLLC

(57) ABSTRACT

The present invention provides a non-transitory computer-readable storage medium storing a program that causes a computer of a portable terminal including a display device to function as: a registration unit accepting registration of user information including at least information about a swing characteristic of a user; an accepting unit accepting input of specifying information that specifies a golf product; a calculation unit reading out information of the golf product specified by the specifying information from a database and calculating a degree of fitting of the golf product to the user based on the readout information and the user information; and a display control unit causing the display device to display a calculation result of the calculation unit.

8 Claims, 9 Drawing Sheets

(51) Int. Cl.
*G06Q 30/06* (2012.01)
*A63B 53/00* (2015.01)
*G06Q 30/02* (2012.01)

(58) Field of Classification Search
CPC ..... A63B 24/0015; A63B 53/00; A63B 60/00;
A63B 69/36; A63B 69/3602; A63B
69/3605; A63B 69/3658; G06Q 30/06;
G06Q 30/0601–30/0643; G06Q 30/08
See application file for complete search history.

(56) References Cited

U.S. PATENT DOCUMENTS

| | | | |
|---|---|---|---|
| 9,418,288 B2 | 8/2016 | Ishikawa et al. | |
| 2006/0030422 A1* | 2/2006 | Rankin | A63B 24/0021 |
| | | | 473/287 |
| 2011/0009215 A1* | 1/2011 | Ichikawa | A63B 69/3655 |
| | | | 473/409 |
| 2012/0108353 A1* | 5/2012 | Kamino | A63B 69/3623 |
| | | | 473/219 |
| 2013/0165246 A1* | 6/2013 | Jeffery | A63B 69/36 |
| | | | 473/223 |
| 2014/0018182 A1* | 1/2014 | Koehler | A63B 24/0003 |
| | | | 473/291 |
| 2014/0357427 A1* | 12/2014 | Ishikawa | H04M 1/7253 |
| | | | 473/407 |

FOREIGN PATENT DOCUMENTS

| | | |
|---|---|---|
| JP | 2006-174870 A | 7/2006 |
| JP | 4405053 B2 | 1/2010 |
| JP | 2014-233420 A | 12/2014 |

\* cited by examiner

FIG. 4A

| HEAD SPEED | 51m/s |
|---|---|
| SMASH FACTOR | 1.45 |
| BACK SPIN AMOUNT | 2700rpm |
| SIDE SPIN AMOUNT | 200rpm |
| PLAY STYLE | DISTANCE-ORIENTED |
| | SPIN-ORIENTED |
| PREFERENCE OF HITTING FEEL | SOFT |
| | SOLID |

FIG. 4B

| DISTANCE Yard | HEAD SPEED m/s |
|---|---|
| 150 | 35 |
| 200 | 40 |
| 250 | 45 |
| 300 | 53 |

FIG. 4C

| HANDICAP (H) | SMASH FACTOR |
|---|---|
| H<5 | 1.50 |
| 5≤H<10 | 1.45 |
| 10≤H<15 | 1.40 |
| 15≤H | 1.35 |

FIG. 4D

| TRACK OF SHOT | | BACK SPIN AMOUNT rpm |
|---|---|---|
| NORMAL | STRAIGHT | 2400 |
| | FADE | 2700 |
| | SLICE | 3000 |
| | DRAW | 2100 |
| | HOOK | 1800 |
| MISSED | SLICE | +10% |
| | HOOK | -10% |

FIG. 4E

| TRACK OF SHOT | | SIDE SPIN AMOUNT rpm |
|---|---|---|
| NORMAL | STRAIGHT | 0 |
| | FADE | 300 |
| | SLICE | 600 |
| | DRAW | -300 |
| | HOOK | -600 |
| MISSED | SLICE | +100% |
| | HOOK | -100% |

FIG. 7

| HEAD SPEED | | 51m/s |
|---|---|---|
| SMASH FACTOR | | 1.45 |
| BACK SPIN AMOUNT | | 2700rpm |
| SIDE SPIN AMOUNT | | 200rpm |
| SWING TYPE | | FACE ROTATION |
| | | LAG |
| | | FACE ANGLE |
| | | DEFLECTION OF SHAFT |
| | | ACCELERATION |
| | | ROTATION |
| TRAJECTORY TYPE | | FADE |
| | | DRAW |
| | | BOTH |
| PREFERENCE OF HEAD | SIZE | SMALL |
| | | LARGE |
| | | ANY TYPE IS POSSIBLE |
| | FACE SHAPE | DEEP |
| | | SHALLOW |
| | | ANY TYPE IS POSSIBLE |
| | OVERALL SHAPE | PEAR |
| | | ROUND |
| | | ANY TYPE IS POSSIBLE |
| | FACE DIRECTION | HOOK |
| | | STRAIGHT |
| | | OPEN |
| | | ANY TYPE IS POSSIBLE |

CALCULATING A DEGREE OF FIT OF A GOLF PRODUCT BASED ON CAPTURED SWING DATA

BACKGROUND OF THE INVENTION

Field of the Invention

The present invention relates to a technique of providing information of a golf product to a user.

Description of the Related Art

There is provided a method of selecting and providing a golf product suitable for a user. In the method of Japanese Patent No. 4405053, a user's golf swing is measured, and a golf product is selected from a plurality of golf products and recommended based on the measurement result.

A user selects a golf product by various factors. Even if a golf product suitable for a user's swing is recommended, he/she does not consider buying unless it meets his/her tastes, and the user satisfaction lowers.

SUMMARY OF THE INVENTION

It is an object of the present invention to provide information useful for a user concerning a golf product in which the user is interested.

According to the present invention, there is provided a non-transitory computer-readable storage medium storing a program that causes a computer of a portable terminal including a display device to function as: a registration unit configured to accept registration of user information including at least information about a swing characteristic of a user; an accepting unit configured to accept input of specifying information that specifies a golf product; a calculation unit configured to read out information of the golf product specified by the specifying information from a database and calculate a degree of fitting of the golf product to the user based on the readout information and the user information; and a display control unit configured to cause the display device to display a calculation result of the calculation unit.

According to the present invention, there is provided a method comprising: a registration step of accepting registration of user information including at least information about a swing characteristic of a user; an accepting step of accepting input of specifying information that specifies a golf product; a calculating step of reading out information of the golf product specified by the specifying information from a database and calculating a degree of fitting of the golf product to the user based on the readout information and the user information; and a display step of displaying a calculation result in the calculation step.

According to the present invention, there is provided a portable terminal including a display device, a processor, and a storage unit, the storage unit storing computer readable instructions that, when executed by the processor, cause the portable terminal to: accept registration of user information including at least information about a swing characteristic of a user; accept input of specifying information that specifies a golf product; read out information of the golf product specified by the specifying information from a database and calculate a degree of fitting of the golf product to the user based on the readout information and the user information; and cause the display device to display a calculation result of the calculating.

Further features of the present invention will become apparent from the following description of exemplary embodiments (with reference to the attached drawings).

BRIEF DESCRIPTION OF THE DRAWINGS

FIG. 4A is a view showing an example of user information;

FIGS. 4B to 4E are views showing examples of choices and numerical values corresponding to the choices;

FIG. 7 is an explanatory view showing an example of application to a golf club.

DESCRIPTION OF THE EMBODIMENTS

<First Embodiment>

Figure 1A:
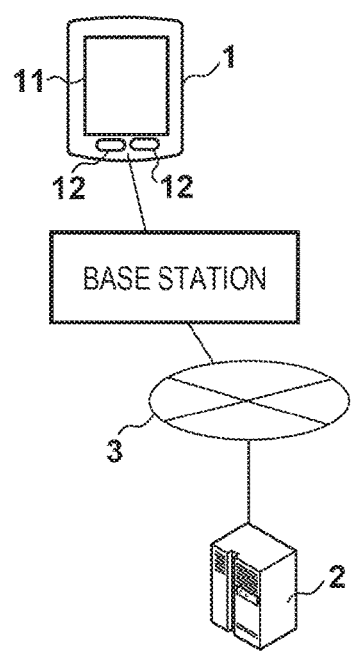
FIG. 1A is a block diagram showing an example of a program providing system.

FIG. 1A is a block diagram showing an example of a system for providing a program to a portable terminal 1. The system shown in FIG. 1A includes the portable terminal 1 and a server 2. The portable terminal 1 and the server 2 are communicably connected via a communication line 3 such as the Internet. The portable terminal 1 can access a web page that the server 2 provides on the communication line 3. The portable terminal 1 is a terminal that includes a touch panel 11, and is, for example, a smartphone.

The server 2 stores an application program executable on the portable terminal 1, which can be downloaded to the portable terminal 1. The application program can be provided to the portable terminal 1 not only by download from the server 2 but also via a storage medium storing the application program.

<Communication Terminal>

Figure 1B:
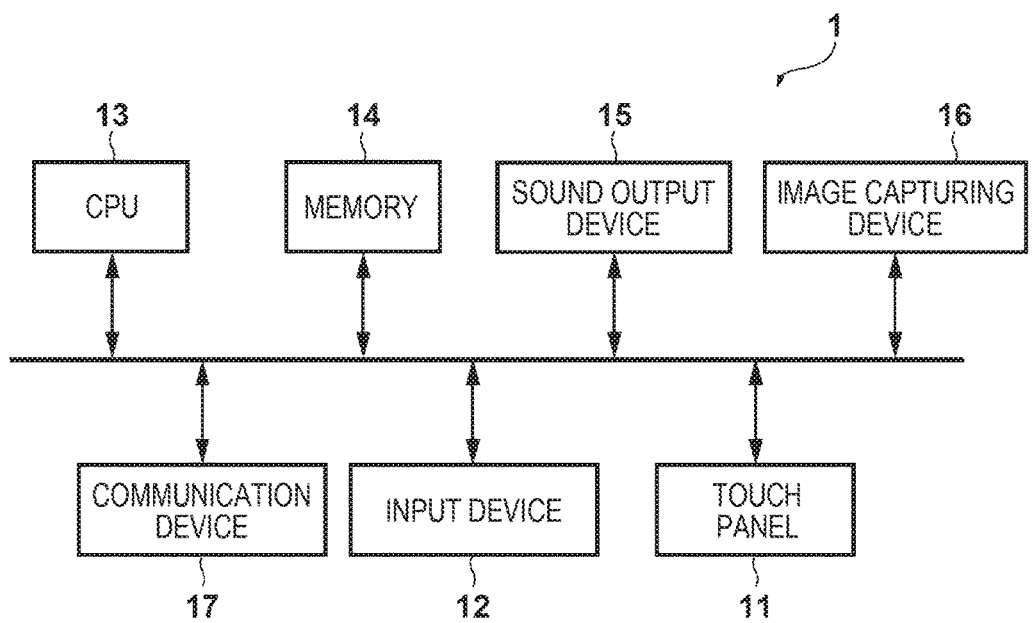
FIG. 1B is a block diagram of a portable terminal.

FIG. 1B is a block diagram of the portable terminal 1. The portable terminal 1 includes the touch panel 11, an input device 12, a CPU 13, a storage device 14, a sound output device 15, an image capturing device 16, and a communication device 17.

The CPU 13 is a processor that controls the entire portable terminal 1. The storage device 14 is, for example, a ROM or a RAM. The storage device 14 can be formed from a plurality of types of memories. The CPU 13 can execute various kinds of programs stored in the storage device 14. The programs executed by the CPU 13 include the application program downloaded from the server 2. The storage device 14 also stores user information (to be described later).

The input device 12 includes button-type switches provided on the portable terminal 1. The touch panel 11 is an input device with a display device, and is formed by stacking a display device such as a liquid crystal display device and an input device that detects the position coordinates of an operation on the display screen. The sound output device 15 is a sound output device such as a speaker.

The image capturing device 16 is a device that captures an image, and is a camera fixed to the portable terminal 1. The communication device 17 can be formed from a plurality of types of communication devices. One of the plurality of types of communication devices is a wireless communication device capable of communicating with a base station. One of the plurality of types of communication devices is a short-distance wireless communication device.

<Matching Program>

An example of a matching program executable by the portable terminal 1 will be described. A matching program that calculates the degree of fitting of a golf product to a user will be described. The matching program can be installed in the portable terminal 1 by, for example, downloading it from the server 2 to the portable terminal 1.

The outline of the matching program will be described. When the matching program is installed, a golf product database (to be sometimes referred to as a product DB hereinafter) is constructed in the storage device 14. The matching program calculates the degree of fitting of a specific golf product designated by the user using the information of the product DB to the user. The user can know the degree of fitting of an interesting golf product to himself/herself. This is useful to determine whether to buy the golf product, as compared to simply recommending a golf product in which the user is less interested. The matching program is roughly divided into processing associated with registration of user information and processing associated with calculation of the degree of fitting. The processing s executed by the portable terminal 1 will sequentially be described below.

<Processing Associated with Registration of User Information>

Figure 2A:
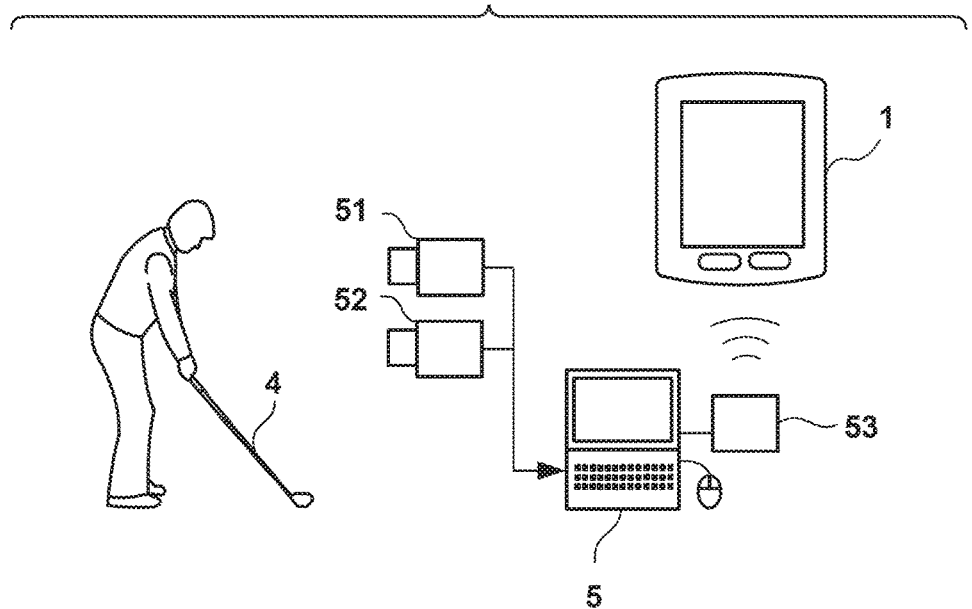
FIGS. 2A and 2B are explanatory views showing examples of measurement devices.
Figure 2B:
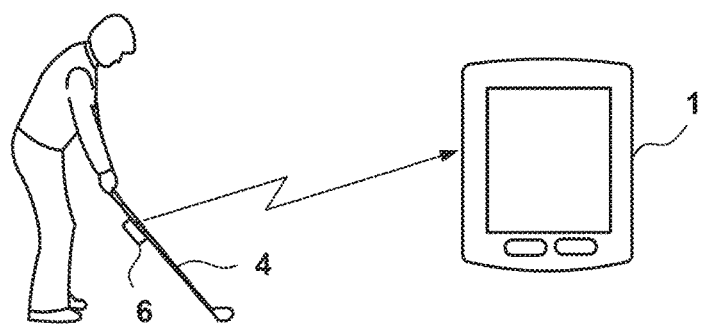

User information is the information of a user used to calculate the degree of fitting, and includes at least information about the swing characteristic of the user. The swing characteristic of the user can be measured by a measurement device. As the measurement device, a device that measures the motion of a golf club (for example, the motion of a golf club head) during a swing or a device that measures the motion of a shot can be used. FIGS. 2A and 2B show examples of measurement devices that measure the swing characteristic.

The measurement device shown in FIG. 2A includes a personal computer 5, a plurality of image capturing devices 51 and 52, and a communication device 53. The personal computer 5 has a function of processing images captured by the image capturing devices 51 and 52. The image capturing devices 51 and 52 are, for example, video cameras, and are arranged so as to have different image capturing directions or ranges. In this embodiment, the two image capturing devices 51 and 52 are illustrated. Depending on the measurement contents, one image capturing device may suffice. A golfer makes a test shot in a test shot room or the like. In the test shot room or the like, the plurality of image capturing devices 51 and 52 capture the user who is making the test shot, the golf club 4, or the shot. Captured images are loaded to the personal computer 5, and the swing characteristic of the user is analyzed. The measurement result is input to the portable terminal 1 via the communication device 53. For example, when the portable terminal 1 is held over the communication device 53, the measurement result of the swing characteristic is input to the portable terminal 1 by short-distance wireless communication and saved.

The measurement device shown in FIG. 2B includes a sensor 6. The sensor 6 is a sensor that is attached to the golf club 4 and measures its three-dimensional behavior. The sensor 6 is, for example, a 9-axis sensor (three axes for accelerations, three axes for angular velocities, and three axes for azimuths). The sensor 6 is attached to, for example, the shaft of the golf club 4. When the user makes a test shot, the sensor 6 measures the behavior of the golf club 4, and the measurement result is input to the portable terminal 1 by short-distance wireless communication and saved.

Figure 3:
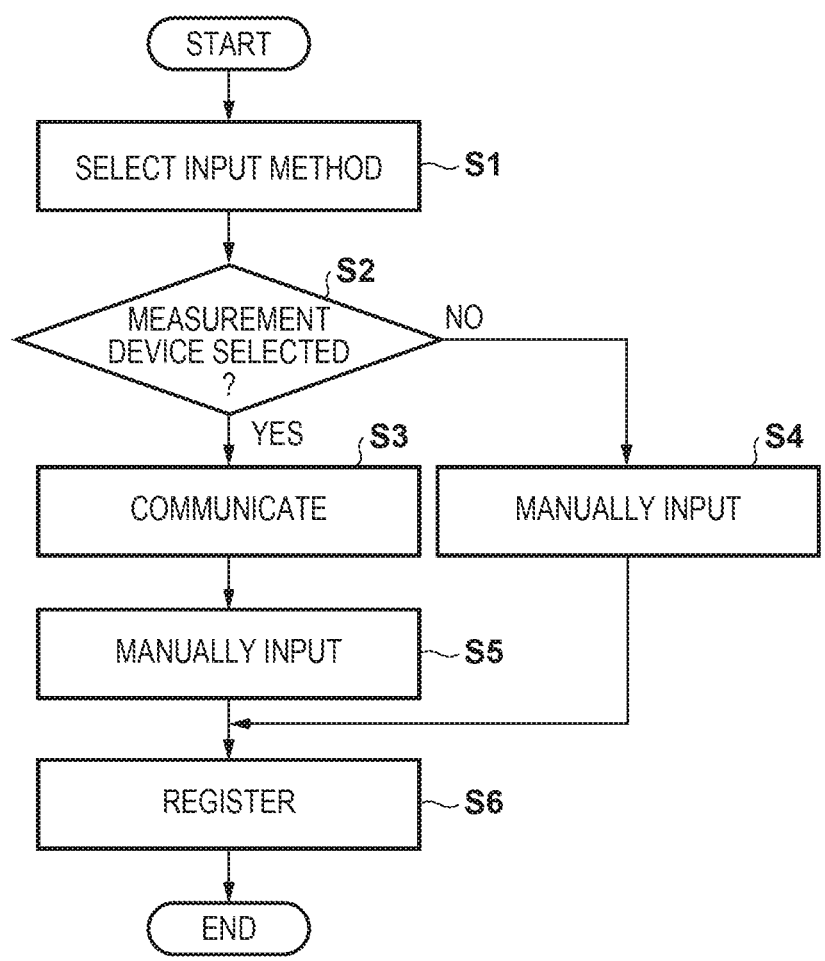
FIG. 3 is a flowchart showing an example of processing executed by the portable terminal.

FIG. 3 is a flowchart showing an example of processing executed by the portable terminal 1 or an example of processing of accepting registration of user information. The swing characteristic of a user can be measured by the above-described measurement device. However, it may be difficult for some users to attain an occasion to perform measurement by the measurement device. In this embodiment, it is possible to select one of a method of inputting the swing characteristic of a user to the portable terminal 1 by a measurement device (to be sometimes referred to as device input hereinafter) and a method of inputting the swing characteristic of a user to the portable terminal 1 by making the user respond to a question (to be sometimes referred to as manual input hereinafter). If the manual input is selectable, even a user who cannot use a measurement device can use the processing of the matching program, and user convenience can be improved.

In step S1, the user is caused to select a swing characteristic input method. For example, a button to select "device input" and a button to select "manual input" are displayed on the touch panel 11, and the input method of the button operated by the user is selected.

In step S2, based on the result of selection in step S1, if the device input is selected, the process advances to step S3. If the manual input is selected, the process advances to step S4.

In step S3, input of information about the swing characteristic is accepted. For example, the following processing is performed. When measuring the swing characteristic by the measurement device illustrated in FIG. 2A, a test shot and analysis by the measurement device are done in advance. In the process of step S3, the portable terminal 1 is held over the communication device 53 to perform short-distance wireless communication. The swing characteristic measurement result is transmitted from the communication device 53 to the portable terminal 1 and saved in the storage device 14. The user can relatively easily input information about the swing characteristic.

When measuring the swing characteristic by the measurement device illustrated in FIG. 2B, the user makes a test shot in the process of step S3. The measurement result is input to the portable terminal 1 and saved in the storage device 14.

In this embodiment, user information also includes information (to be sometimes referred to as other information hereinafter) other than the information about the swing characteristic. Hence, the process advances to step S5 to perform processing of accepting input of other information. To accept input of other information, for example, a method of displaying, on the touch panel 11, choices selectable by the user and causing the user to select one of the choices can be employed. In step S6, the pieces of user information accepted in steps S3 and S5 are stored in the storage device 14 in a predetermined data format, thus completing user information registration by "device input".

In step S4, input of information about the swing characteristic and other information is accepted. To accept input of these pieces of information, for example, a method of displaying, on the touch panel 11, choices selectable by the user and causing the user to select one of the choices or a method of displaying an input box and causing the user to input information to the input box can be employed. In step S6, the pieces of user information accepted in step S4 are stored in the storage device 14 by a predetermined data format, thus completing user information registration by "manual input".

FIG. 4A shows an example of user information. The user information includes a plurality of types of items. In the example of FIG. 4A, a head speed, a smash factor, a back spin amount, and a side spin amount are illustrated as pieces of information about the swing characteristic. All the pieces of information are numerical information based on a case in which a driver hits a golf ball. The head speed is the speed of the golf club head at impact. The smash factor is calculated by an equation: smash factor=initial speed of a ball/head speed. The back spin amount is the back spin amount of a shot. The side spin amount is the side spin amount of a shot. The spin amount in the slice direction can be a positive value, and the spin amount in the hook direction can be a negative value.

In the example of FIG. 4A, other information includes a play style and a preference of hitting feel. The play style is information about the individuality of a user's golf play, and one of distance-oriented and spin-oriented can be selected here. Distance-oriented means a golfer who places emphasis on the distance of a driver. Spin-oriented means a golfer who places emphasis on the spin amount of a shot. The user selects one of the choices that fits him/her. The preference of hitting feel is user's preference information concerning a golf product, and one of soft feel and solid feel can be selected here as the preference of hitting feel on a ball.

If device input is selected in step S1 of FIG. 3, the head speed, the smash factor, the back spin amount, and the side spin amount out of the user information shown in FIG. 4A are input in step S3, and the play style and the preference of hitting feel are input in step S5.

If manual input is selected in step S1 of FIG. 3, all the pieces of user information shown in FIG. 4A are input in step S4. Since the pieces of information about the swing characteristic are numerical information, the user may have no idea of specific numerical values. Hence, in step S4, a user's answer to a question is converted into a numerical value. FIGS. 4B to 4E show examples of the converted information.

FIG. 4B shows an example in which the user is asked a question about the distance of a driver, and a user's answer is converted into a head speed. In the example of FIG. 4B, if the user answers that the distance is 150 yards, the head speed is set to 35 m/s. If the distance is 200 yards, the head speed is set to 40 ms. The distance may be selectable from only four types (150 yards, 200 yards, 250 yards, and 300 yards) shown in FIG. 4B. Alternatively, the user may be allowed to input an arbitrary value, and the head speed may be specified in the same proportion. For example, if a distance of 175 yards is input, the head speed may be specified as 37.5 m/s. A focus is placed on the fact that the distance and the head speed are almost in proportion to each other.

FIG. 4C shows an example in which the user is asked a question about a handicap, and a user's answer is converted into a smash factor. If the handicap is lower than 5, the smash factor is set to 1.50. If the handicap ranges from 5 (inclusive) to 10 (exclusive), the smash factor is set to 1.45. A focus is placed on the fact that the more skillful the golfer is, the higher the smash factor tends to be.

FIG. 4D shows an example in which the user is asked a question about the track of a shot, and a user's answer is converted into a back spin amount. The question is made in two steps. The user is asked the tendency of a normal track (the tendency of the track in an almost satisfactory hit) and the tendency of the track of a missed shot. If the normal track tends to be straight, the back spin amount is temporarily determined as 2,400 rpm. If the track of a missed shot tends to be a slice, a spin amount of 10% (that is, 240 rpm) is added to set the final back spin amount to 2,640 rpm. If the normal track tends to be a slice, the back spin amount is temporarily determined as 3,000 rpm. If the track of a missed shot tends to be a hook, a spin amount of 10% (that is, 300 rpm) is subtracted to set the final back spin amount to 2,700 rpm. A focus is placed on the fact that the track of a shot and the back spin amount are associated with each other.

FIG. 4E shows an example in which the user is asked a question about the track of a shot, and the user's answer is converted into a side spin amount. The mechanism is the same as in the example of FIG. 4D, and the question is made in two steps. If the normal track tends to be a fade, the side spin amount is temporarily determined as 300 rpm. If the track of a missed shot tends to be a slice, a spin amount of 100% (that is, 300 rpm) is added to set the final side spin amount to 600 rpm. If the normal track tends to be a hook, the side spin amount is temporarily determined as −600 rpm. If the track of a missed shot tends to be a hook, a spin amount of 100% (that is, 600 rpm) is subtracted to set the final side spin amount to −1200 rpm. A focus is placed on the fact that the track of a shot and the side spin amount are associated with each other.

<Processing Associated with Calculation of Degree of Fitting>

Figure 5A:
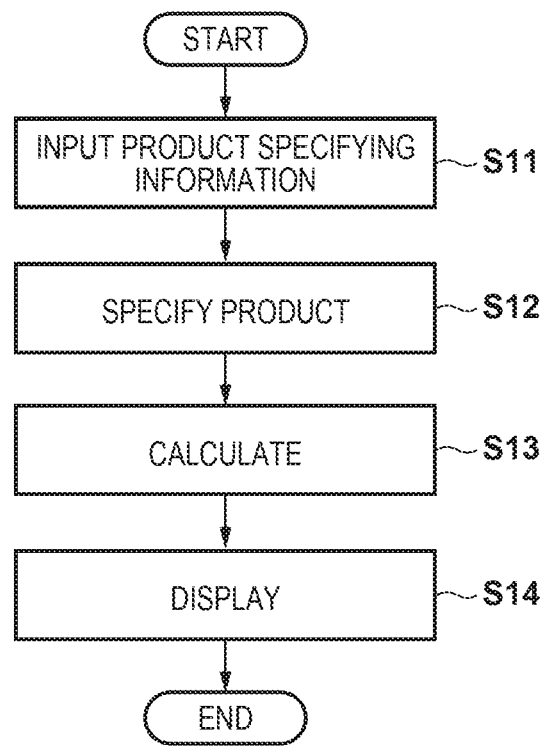
FIG. 5A is a flowchart showing an example of processing executed by the portable terminal.

When user information registration is completed, calculation of the degree of fitting a specific golf product to the user becomes possible. Here, the golf product is assumed to be a golf ball. FIG. 5A is a flowchart showing an example of processing executed by the portable terminal 1 or an example of processing associated with calculation of the degree of fitting.

Figure 5B:
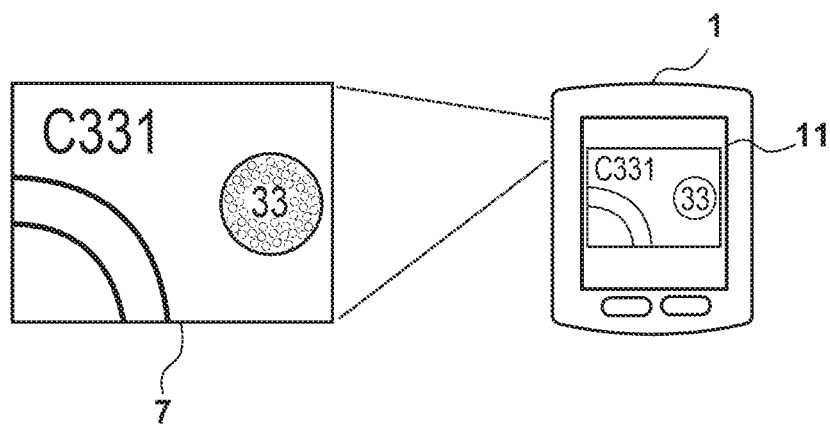
FIG. 5B is a view showing an example of an input form of specific information.

In step S11, information for specifying a golf product is input. In this embodiment, the specifying information is a captured image of a golf product or the package of a golf product. FIG. 5B shows an example of an input form. In the example of FIG. 5B, the image capturing device 16 of the portable terminal 1 captures the package of golf balls. The captured image is displayed on the touch panel 11. The example of FIG. 5B assumes a case in which a box containing a dozen golf balls with a trade name of C331 is captured. Note that the input of specifying information is not limited to this, and a barcode or two-dimensional code may be read, or a product name may manually be input.

Referring back to FIG. 5A, in step S12, a golf product for which a degree of fitting is to be calculated is specified from the information of the product DB based on the specifying information input in step S11. The golf product is specified by, for example, recognizing the image input in step S11 by a known image recognition technology and specifying one of a plurality of golf products with information stored in the product DB.

Figure 6:
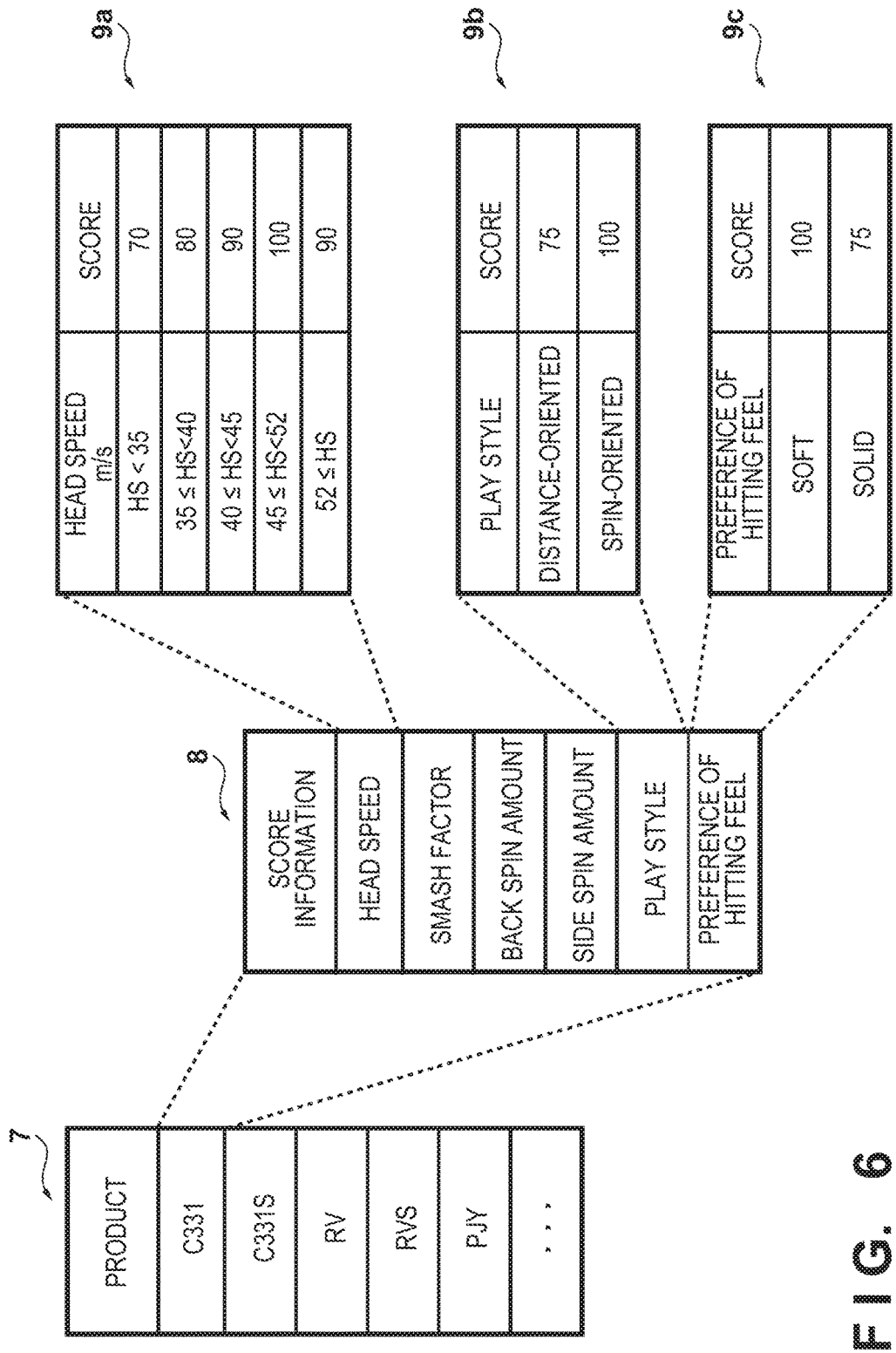
FIG. 6 is a data structure diagram showing an example of product information.

In step S13, the information of the golf product specified in step S12 is read out from the product DB, and the degree of fitting is calculated based on the readout information and the user information. FIG. 6 is a data structure diagram showing an example of product information stored in the product DB.

The product information includes trade name information 7 for specifying a golf product and score information 8 of each product. In the trade name information 7, names such as C331, C331S, RV, . . . indicate trade names. The score information 8 is information that assigns, for each of the plurality of types of items of user information, a score corresponding to the information of each item. The user information shown in FIG. 4A includes six types of items, that is, a head speed, a smash factor, a back spin amount, a side spin amount, a play style, and a preference of hitting feel. For this reason, the score information 8 also includes pieces of information of a head speed, a smash factor, a back spin amount, a side spin amount, a play style, and a preference of hitting feel.

Score information 9a shows pieces of score information of head speeds. If the head speed in the user information is lower than 35 m/s, the score of the head speed is 70. Similarly, if the head speed in the user information ranges from 45 m/s (inclusive) to 52 m/s (exclusive), the score of the head speed is 100.

This is score assignment for the golf ball of trade name: C331. If the golf product changes, the score assignment may change. The maximum score is 100. The golf ball of trade name: C331 is suitable for a user with the head speed ranging from 45 m/s (inclusive) to 52 m/s.

Although not particularly illustrated, scores are assigned even for the smash factor, the back spin amount, and the side spin amount.

Score information 9b shows pieces of score information of play styles. If the play style in the user information is distance-oriented, the score is 75. If the play style in the user information is spin-oriented, the score is 100. The golf ball of trade name: C331 is suitable for a user who places emphasis on spin.

Score information 9c shows pieces of score information of tastes of hitting feel. If the preference of hitting feel in the user information is soft, the score is 100. If the preference of hitting feel in the user information is solid, the score is 75. The golf ball of trade name: C331 is suitable for a user who likes a soft hitting feel.

In this way, the score of each item is specified. The degree of fitting is then calculated from all the specified scores. The degree of fitting is calculated, for example, in the following way. Let SC1, SC2, SC3, SC4, SC5, and SC6 be the scores of the head speed, the smash factor, the back spin amount, the side spin amount, the play style, and the preference of hitting feel, respectively. Also let α1, α2, α3, α4, α5, and α6 be the weighting coefficients of the items. In this embodiment, the weighting coefficient are fixed values. Then, degree of fitting (%)=α1×SC1+α2×SC2+α3×SC3+α4×SC4+α5×SC5+α6×SC6 can be calculated.

For example, assume that SC1=70, SC2=80, SC3=90, SC4=90, SC 5=100, and SC 6=80, and α1=0.1, α2=0.1, α3=0.2, α4=0.3, α5=0.3, α6=0.1. Then, degree of fitting (%)=0.1×70+0.1×80+0.2×90+0.3×90+0.3×100+0.1×80=98% is calculated. Note that the sum of weighting coefficients is 1.

Referring back to FIG. 5A, in step S14, the calculation result of step S13 is displayed on the touch panel 11. One unit of processes thus ends.

As described above, according to this embodiment, if a user finds an interesting golf product at a store or on a magazine or the like, he/she captures the golf product using the portable terminal 1, thereby obtaining the degree of fitting of the golf product to himself/herself. This is useful to determine whether to buy the golf product.

<Second Embodiment>

The items of user information and score information are not limited to the examples of FIGS. 4A and 6. For example, the items of the information about the swing characteristic may include at least one of the head speed, the smash factor, the back spin amount, and the side spin amount or may include another item. At least some items may be replaced with other items. Examples of other items of the information about the swing characteristic are a swing distance difference, a swing angle difference, an impact face angle, a head track in an impact zone, and a face change rate in an impact zone. The swing distance difference and the swing angle difference are characteristics concerning a head track during a swing. The swing distance difference is the difference between the head track of a back swing and the head track of a down swing. The swing angle difference is the difference between the angle of the head track of a follow swing with respect to a horizontal plane and the angle of the head track of a down swing with respect to the horizontal plane. The impact face angle is the direction of the face of a head at an impact position. The head track in an impact zone is the moving direction of a head in an impact zone. The face change rate in an impact zone is the rate of a change in the direction of the face with respect to the moving direction of a head in an impact zone.

Additionally, in the first embodiment, a golf ball has been exemplified as the golf product to calculate the degree of fitting. However, any other golf product such as a golf club may be used. FIG. 7 illustrates the items of user information and score information in a case in which the golf product to calculate the degree of fitting is a golf club. Information about the swing characteristic of a user includes a head speed, a smash factor, a back spin amount, a side spin amount, and a swing type. The swing type includes face rotation, lag (a timing of releasing a club in a down swing), and the like. The swing type may be data based on a measurement result of a measurement device or data based on an answer to a question.

As other information, a trajectory type and a preference of a head are included. The trajectory type is associated with a user's preference concerning the control of shots. Here, the trajectory type is discriminated by whether to use a lot of fade balls, whether to use a lot of draw balls, or whether to use both balls as needed. The preference of a head includes a size (head volume), a face shape (the shape of a face), an overall shape (the outer appearance of a whole head), and a face direction.

<Third Embodiment>

If there is a golf product for which a degree of fitting is higher than that of the golf product specified in step S12 of FIG. 5A, the golf product may be presented to the user. For example, in step S13, the degree of fitting is calculated not only for the golf product specified in step S12 but also for other golf products with information stored in the product DB. If a golf product for which degree of fitting is higher than that of the golf product specified in step S12 is found, in step S14, the degree of fitting of the golf product specified in step S12 is displayed, and the information and the degree of fitting of the golf product with the higher degree of fitting are also displayed. This allows the user to obtain the information of a golf product more suitable for him/her in addition to the degree of fitting of the interesting golf product. This is useful to determine whether to buy the golf product.

<Fourth Embodiment>

In the first embodiment, all processes of the matching program are performed by the portable terminal 1. However, some processes may be executed by the server. In addition, the product DB or user information may be managed by the server.

Figure 8:
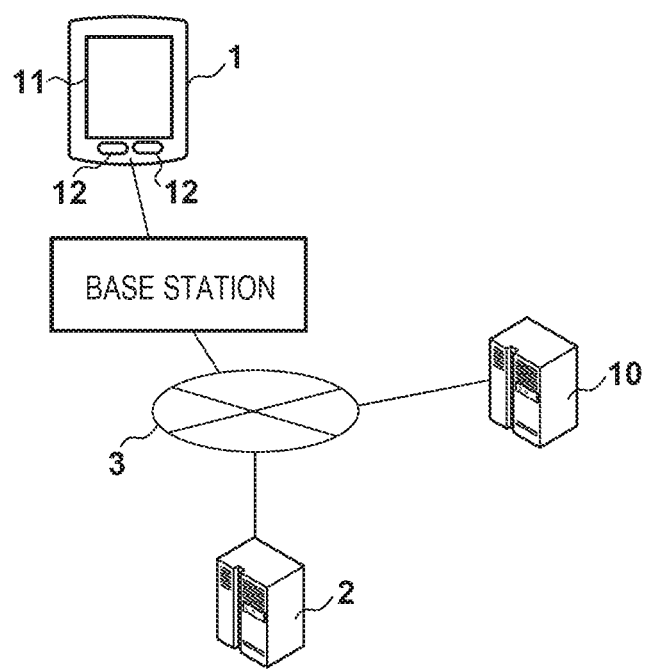
FIG. 8 is an explanatory view showing an example of application to a client-server system.

FIG. 8 is a block diagram showing a client-server system as an example. A server 10 is a server that executes part of a matching program, and includes a product DB.

A form that stores user information in a portable terminal 1 and a form that stores user information in the server 10 can be employed.

In the form that stores user information in the portable terminal 1, the processing shown in FIG. 3 can be executed by the portable terminal 1. As for the processing shown in FIG. 5A, step S11 is executed by the portable terminal 1. In addition, processing of transmitting specifying information and user information to the server 10 is performed. The server 10 executes the processes of steps S12 and S13, and transmits the calculation result to the portable terminal 1. The portable terminal 1 performs the process of step S14.

In the form that stores user information in the server 10, the processing shown in FIG. 3 is basically executed by the portable terminal 1 or a store terminal at a golf store. In step S6, the portable terminal 1 or store terminal transmits user information to the server 10, and the server 10 stores and registers the user information. As for the processing shown in FIG. 5A, step S11 is executed by the portable terminal 1. In addition, processing of transmitting specifying information to the server 10 is performed. The server 10 executes the processes of steps S12 and S13, and transmits the calculation result to the portable terminal 1. The portable terminal 1 performs the process of step S14.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-125924, filed Jun. 23, 2015, which is hereby incorporated by reference herein in its entirety.

What is claimed is:

1. A system comprising:
   a swing measuring device comprising one of an image capture device or a sensor disposed on a golf club, the swing measuring device configured to capture swing data when the golf club is swung by a user; and
   a portable device including a processor, a display, and a storage unit, the portable device configured to:
      install a matching program received from a server, the matching program configured to enable the portable device to communicate with the swing measuring device and to calculate a degree of fitting of a specified golf product;
      responsive to the installation of the matching program, create a golf product database in the storage unit, the golf product database configured to:
         store a plurality of golf products, each golf product of the plurality of golf products having a plurality of types of items;
         for each of the plurality of types of items, store a plurality of assigned scores, each of the plurality of assigned scores assigned to a particular item type;
      receive, from the swing measuring device, captured swing data communicated from the swing measurement device, the captured swing data comprising a plurality of types of items;
      register, in the storage device as user information, the plurality of item types of the captured swing data;
      accept, through the display, input of specifying information that specifies a golf product;
      calculate, by the processor, a degree of fitting of the specified golf product, wherein the calculation comprises:
         reading, from the database stored in the storage unit, a plurality of the assigned scores for the specified golf product, the plurality of read assigned scores corresponding to the plurality of types of items of the user information, and,
         calculating the degree of fitting from all of the plurality of read assigned scores;
      output, on the display, the result of the calculation including an indication of the degree of fitting of the specified golf product.

2. The system according to claim 1, wherein the calculating the degree of fitting comprises
   if there is a golf product for which a degree of fitting to the user is higher than that of the golf product specified by the specifying information, the display is configured to display the degree of fitting of the golf product specified by the specifying information and the information of the golf product with the higher degree of fitting.

3. The system according to claim 2, wherein the display displays the degree of fitting of the golf product with the higher degree of fitting.

4. The system according to claim 1, wherein concerning at least some pieces of information out of the user information, the portable device can accept one of registration by manual input or registration by wireless communication with the swing measurement device.

5. The system according to claim 1, wherein the information about the swing characteristic includes at least one of
   information about a head speed at impact,
   information about a smash factor at impact, and
   information about a spin amount of a shot.

6. The system according to claim 1, wherein the user information includes information about a preference for a golf product.

7. A non-transitory computer readable medium storing program code that, when executed by a processor, is configured to cause performance of the steps comprising:
   install, on a portable device, a matching program received from a server, the matching program configured to enable the portable device to communicate with a swing measuring device and to calculate a degree of fitting of a specified golf product;
   responsive to the installation of the matching program, create a golf product database in a storage unit of the portable device, the golf product database configured to:
      store a plurality of golf products, each golf product of the plurality of golf products having a plurality of types of items;
      for each of the plurality of types of items, store a plurality of assigned scores, each of the plurality of assigned scores assigned to a particular item type;
   receive, from the swing measuring device, captured swing data communicated from the swing measurement device, the captured swing data comprising a plurality of types of items;
   register, in the storage device as user information, the plurality of item types of the captured swing data;
   accept, through the display, input of specifying information that specifies a golf product;
   calculate a degree of fitting of the specified golf product, wherein the calculation comprises:

reading, from the database stored in the storage unit, a plurality of the assigned scores for the specified golf product, the plurality of read assigned scores corresponding to the plurality of types of items of the user information, and, calculating the degree of fitting from all of the plurality of read assigned scores;

output to a display the result of the calculation including an indication of the degree of fitting of the specified golf product.

8. A method comprising:

installing, on a portable device, a matching program received from a server, the matching program configured to enable the portable device to communicate with a swing measuring device and to calculate a degree of fitting of a specified golf product;

in response to the installation of the matching program, creating a golf product database in a storage unit of the portable device, the golf product database configured to:

store a plurality of golf products, each golf product of the plurality of golf products having a plurality of types of items;

for each of the plurality of types of items, store a plurality of assigned scores, each of the plurality of assigned scores assigned to a particular item type;

receiving, from the swing measuring device, captured swing data communicated from the swing measurement device, the captured swing data comprising a plurality of types of items;

registering, in the storage device as user information, the plurality of item types of the captured swing data;

accepting, through the display, input of specifying information that specifies a golf product;

calculating a degree of fitting of the specified golf product, wherein the calculating comprises:

reading, from the database stored in the storage unit, a plurality of the assigned scores for the specified golf product, the plurality of read assigned scores corresponding to the plurality of types of items of the user information, and, calculating the degree of fitting from all of the plurality of read assigned scores;

outputing to a display the result of the calculation including an indication of the degree of fitting of the specified golf product.

* * * * *